(12) United States Patent
Moratz

(10) Patent No.: US 9,587,678 B2
(45) Date of Patent: Mar. 7, 2017

(54) NON-CONTACTING FIBER LAMINATE BEARING SEAL

(71) Applicant: Schaeffler Technologies AG & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/950,989

(22) Filed: Nov. 24, 2015

(65) Prior Publication Data

US 2016/0076594 A1     Mar. 17, 2016

(51) Int. Cl.
F16C 33/78     (2006.01)
F16C 19/06     (2006.01)
F16J 15/32     (2016.01)

(52) U.S. Cl.
CPC .......... *F16C 33/7846* (2013.01); *F16C 19/06* (2013.01); *F16C 33/7856* (2013.01); *F16J 15/3268* (2013.01)

(58) Field of Classification Search
CPC .... F16C 19/06; F16C 33/7816; F16C 33/784; F16C 33/7846; F16C 33/80; F16C 2240/40; F16C 33/7856; F16J 15/3268; F16J 15/3284
USPC .............. 384/484, 477, 485, 488–489, 490; 277/349, 404, 411, 412, 549
See application file for complete search history.

(56) References Cited

U.S. PATENT DOCUMENTS

| | | | | |
|---|---|---|---|---|
| 4,153,258 A | * | 5/1979 | Huber ................. | F16J 15/3412 277/424 |
| 4,509,869 A | * | 4/1985 | Johnston .............. | F16C 33/427 384/462 |
| 4,805,919 A | * | 2/1989 | Wiblyi ................ | F16J 15/3268 277/560 |

(Continued)

FOREIGN PATENT DOCUMENTS

| | | | |
|---|---|---|---|
| DE | 1963033 A1 * | 7/1970 | ............. F16C 33/80 |
| DE | 4329398 A1 * | 7/1994 | ......... F16C 33/6674 |

(Continued)

OTHER PUBLICATIONS

Barden/FAG Non-Contact Sealed Spindle Bearings: An Investment in Bearing Life; The Barden Corporation, Danbury CT, USA; C. Moratz (dated Nov. 30, 2005).

(Continued)

*Primary Examiner* — Marcus Charles
(74) *Attorney, Agent, or Firm* — Volpe and Koenig, P.C.

(57) ABSTRACT

A rolling bearing assembly including an elastomeric seal arranged at least partially within a circumferentially extending groove of a bearing ring is provided. The elastomeric seal is arranged between the radially inner ring and the radially outer ring. The elastomeric seal includes a radially outer end engaged within a first circumferentially extending groove of the radially outer ring, and a radially inner end extending radially inwardly towards the radially inner ring and arranged at least partially within the second circumferentially extending groove of the radially inner ring. Clearance is provided between the radially inner end of the elastomeric seal and the second circumferentially extending groove of the radially inner ring.

6 Claims, 4 Drawing Sheets

(56) References Cited

U.S. PATENT DOCUMENTS

| | | | | |
|---|---|---|---|---|
| 4,816,114 A * | 3/1989 | Held | ............... | B30B 5/062 100/154 |
| 5,332,374 A * | 7/1994 | Kricker | ............... | F04D 15/0066 417/420 |
| 5,333,957 A * | 8/1994 | Yip | ............... | F16C 33/7853 277/411 |
| 5,433,533 A * | 7/1995 | Imazaike | ............... | F16C 33/7846 384/488 |
| 5,575,569 A * | 11/1996 | Shinohara | ............... | F16C 33/6614 384/470 |
| 6,402,158 B1 * | 6/2002 | Imazaike | ............... | F16C 33/7846 277/549 |
| 6,776,531 B2 * | 8/2004 | Tsuchida | ............... | F16C 33/7853 384/484 |
| 7,448,807 B2 * | 11/2008 | Schenk | ............... | F16C 13/006 384/417 |
| 8,956,052 B2 | 2/2015 | Hofbauer et al. | | |
| 2003/0048965 A1 * | 3/2003 | Miyazaki | ............... | F16C 25/083 384/537 |

FOREIGN PATENT DOCUMENTS

| | | | |
|---|---|---|---|
| JP | 63034320 A | | 2/1988 |
| JP | 2004019722 A | * | 1/2004 |
| JP | 2007154815 A | * | 6/2007 |

OTHER PUBLICATIONS

Barden: Precision Bearing Closures, Flexeal, Barseal, Shield (dated Jan. 1999).

\* cited by examiner

NON-CONTACTING FIBER LAMINATE BEARING SEAL

FIELD OF INVENTION

The present invention relates to a rolling bearing assembly, and more particularly relates to an improved seal arrangement for a rolling bearing assembly.

BACKGROUND

Bearing assemblies are used in a wide range of applications. Seals or shields are used in bearing assemblies to prevent the ingress and/or egress of fluid or debris from the races and rolling elements of the rolling bearing assembly. Shields are typically formed from an inflexible material and require a relatively large gap between the end of the shield and a bearing ring. One type of known seal configuration requires the seal to contact the rotating bearing ring; however, this is undesirable in certain high speed, low torque applications since the seal contact generates drag and friction with the rotating bearing ring.

It would be desirable to provide an improved sealing arrangement that provides a reliable seal and does not produce drag on a bearing ring.

SUMMARY

A rolling bearing assembly including a non-contacting, flexible seal is provided. The rolling bearing assembly includes a radially outer ring defining an outer race, and the radially outer ring includes at least one first circumferentially extending groove. A radially inner ring defines an inner race, and the radially inner ring includes at least one second circumferentially extending groove. Rolling elements are supported between the radially inner ring and the radially outer ring, and the rolling elements run on the inner race and the outer race. At least one elastomeric seal is arranged between the radially inner ring and the radially outer ring. The at least one elastomeric seal includes a radially outer end engaged within the at least one first circumferentially extending groove of the radially outer ring, and a radially inner end extending radially inwardly towards the radially inner ring and arranged at least partially within the at least one second circumferentially extending groove of the radially inner ring. Clearance is provided between the radially inner end of the at least one elastomeric seal and the at least one second circumferentially extending groove of the radially inner ring. This seal arrangement provides two advantages: (1) there is no drag or friction on the bearing ring due to the clearance, and (2) the extension of the radially inner end of the seal into the circumferentially extending groove provides a labyrinth-like tortuous path for retaining lubricant or blocking debris.

In another aspect, a second embodiment of a rolling bearing assembly is provided. In this embodiment, the radially inner ring includes at least one first circumferentially extending notch instead of a groove. Similar to the first embodiment, a radially inner end of the seal extends radially inwardly towards the radially inner ring and is arranged at least partially within the at least one first circumferentially extending notch of the radially inner ring, and clearance is provided between the radially inner end of the at least one elastomeric seal and the at least one first circumferentially extending notch of the radially inner ring.

BRIEF DESCRIPTION OF THE DRAWINGS

The foregoing Summary and the following detailed description will be better understood when read in conjunction with the appended drawings, which illustrates a preferred embodiment of the invention. In the drawings.

DETAILED DESCRIPTION OF THE PREFERRED EMBODIMENTS

Figure 1A:
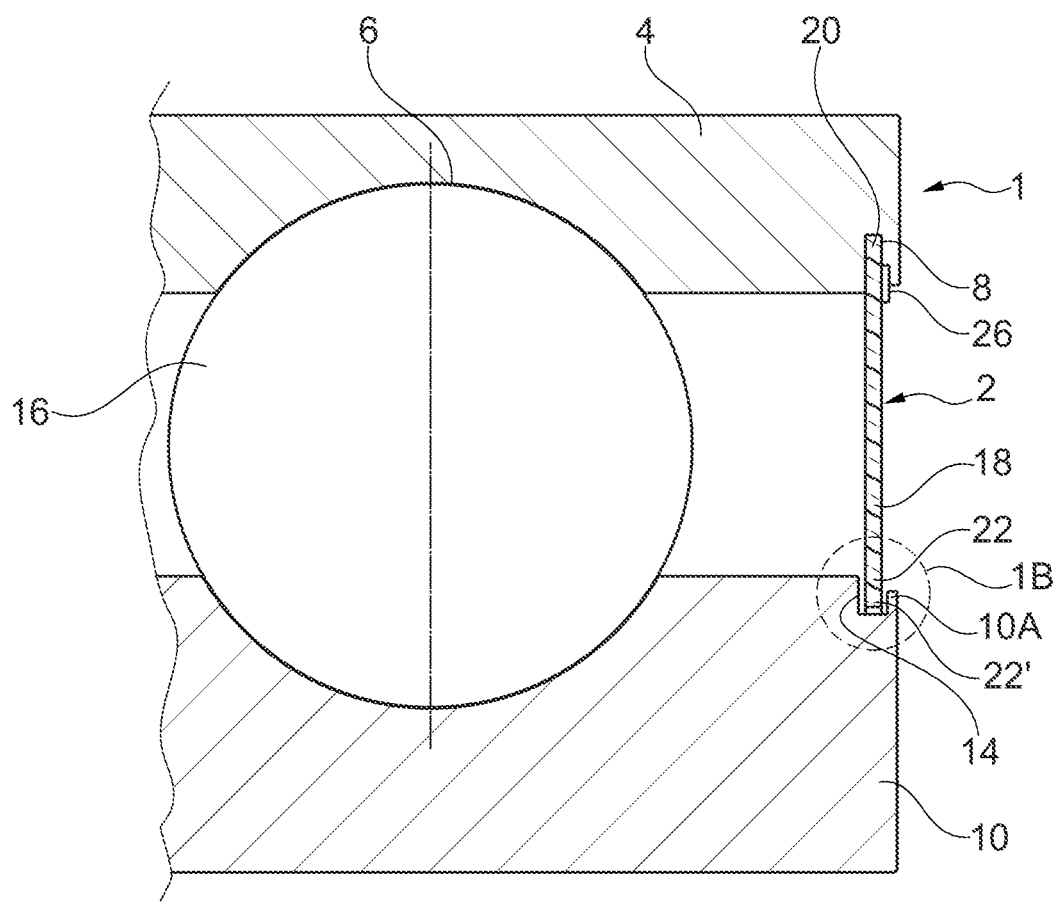
FIG. 1A shows a cross-sectional view through a first embodiment of a rolling bearing assembly including a non-contacting flexible seal.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

FIG. 1A shows a first embodiment of a rolling bearing assembly 1 including a non-contacting seal 2. The rolling bearing assembly 1 includes a radially outer ring 4 defining an outer race 6. The radially outer ring 4 also includes at least one first circumferentially extending groove 8 at a first axial end. The rolling bearing assembly 1 includes a radially inner ring 10 that defines an inner race 12. The radially inner ring 10 includes at least one second circumferentially extending groove 14 at a first axial end. Rolling elements 16 are supported between the radially inner ring 10 and the radially outer ring 4, and the rolling elements 16 run on the inner race 12 of the radially inner ring 10 and the outer race 6 of the radially outer ring 4.

At least one elastomeric seal 18 is arranged between the radially inner ring 10 and the radially outer ring 4. The at least one elastomeric seal 18 is preferably comprised of a fiber laminate. In another embodiment, the at least one elastomeric seal 18 is comprised of carbon fiber. The at least one elastomeric seal 18 includes a radially outer end 20 engaged within the at least one first circumferentially extending groove 8 of the radially outer ring 4, and a radially inner end 22 extends radially inwardly towards the radially inner ring 10 and is arranged at least partially within the at least one second circumferentially extending groove 14 of the radially inner ring 10. A snap ring 26 is preferably inserted in the groove 8 to hold the seal 18 in position. A flexible sealing lip 22' preferably defines the radially inner end 22 of the at least one elastomeric seal 18.

Figure 1B:
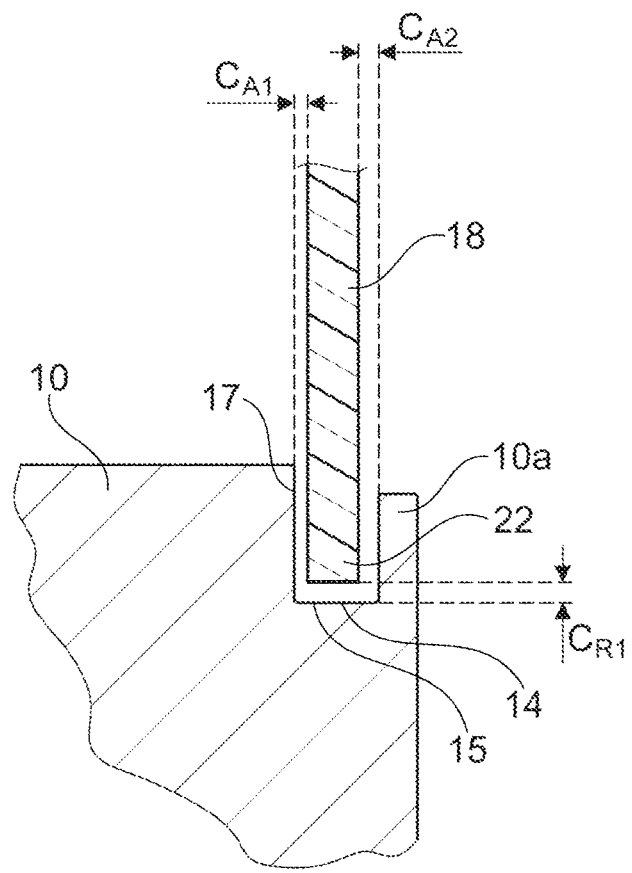
FIG. 1B shows a magnified view of a radially inner end of the seal of FIG. 1A.

FIG. 1B shows a magnified view of the radially inner end 22 of the at least one elastomeric seal 18 from FIG. 1A. As shown in FIG. 1B, a clearance is provided between the radially inner end 22 of the at least one elastomeric seal 18 and the at least one second circumferentially extending groove 14 of the radially inner ring 10. As shown in FIG. 1B, both an axial clearance $C_{A1}$, $C_{A2}$ and a radial clearance $C_{R1}$ are provided between the radially inner end 22 of the at least one elastomeric seal 18 and the at least one second circumferentially extending groove 14 of the radially inner ring 10. The groove 14 in the radially inner ring 10 preferably forms a retention rim 10*a* at a first axial end surface of the radially inner ring 10 so that an annular retention pocket is formed for the radially inner end 22 of the at least one elastomeric seal 18. However, this retention rim 10*a* could be eliminated with the groove 14 extending to the axial end surface of the ring 10. As shown in FIG. 1B, axial clearance $C_{A1}$, $C_{A2}$ are provided on both axial sides of the at least one elastomeric seal 18, between (1) the at least one elastomeric seal 18 and a first inner wall 17 of the at least one second circumferentially extending groove 14, and (2) the at least one elastomeric seal 18 and a second inner wall of the groove 14. In this arrangement, the outboard retention rim 10*a* acts as a flinger, which flings contaminants and undesirable materials away from the seal based on centrifugal force during rotation. By limiting the radial clearance $C_{R1}$ and the axial clearance $C_{A1}$, $C_{A2}$ between the radially inner end 22 of the seal 18 and the radially inner ring 10, a simplified labyrinth-like seal is provided that impedes ingress and egress of fluid and debris with respect to the races 6, 12 of the rolling bearing assembly 1. The radial clearance $C_{R1}$ between the radially inner end 22 and a radially outer end face 15 of the at least one second circumferentially extending groove 14 is preferably 0.02-0.03 inches. Each of the axial clearances $C_{A1}$, $C_{A2}$ provided between the radially inner end 22 and the axial end face 17 of the at least one second circumferentially extending groove 14, and the radially inner end 22 and the retention rim 10*a* is preferably 0.02-0.03 inches. One of ordinary skill in the art would recognize from the present application that the dimensions for the clearances can be varied depending on the specific bearing size and application. The bearing assembly 1 can be pre-lubricated with grease or lubricating fluid during assembly. The fiber laminate material of the seal 2 allows for impregnation of the grease or lubricating fluid into the bearing assembly 1.

Figure 2A:
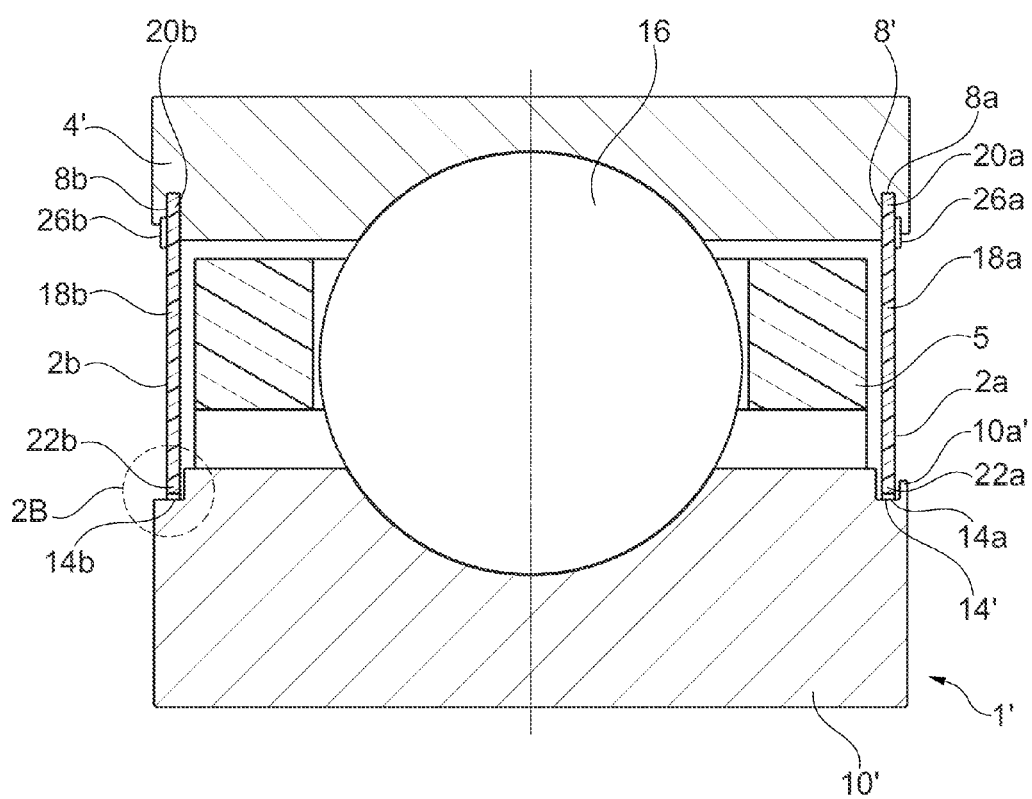
FIG. 2A shows a cross-sectional view through a second embodiment of a rolling bearing assembly including two non-contacting flexible seals.
Figure 2B:
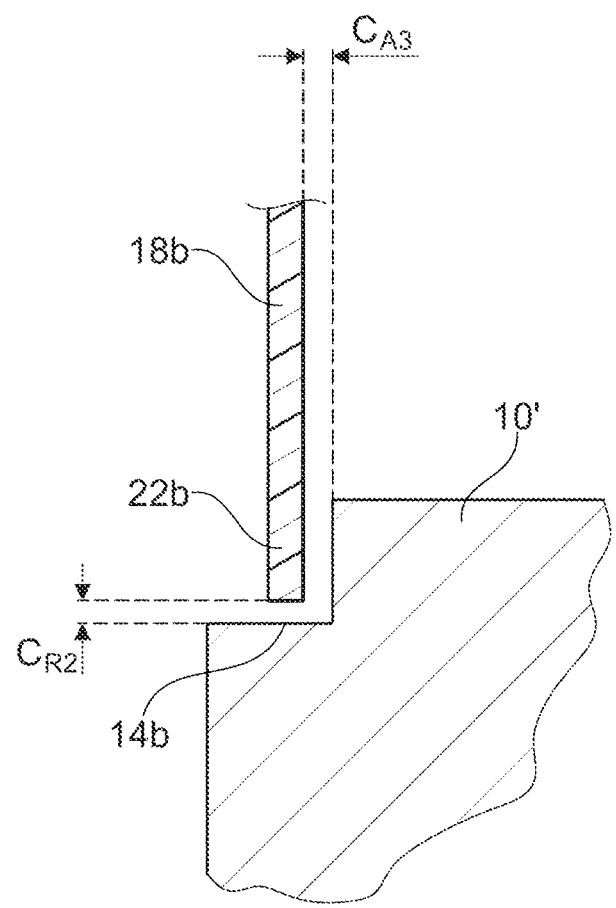
FIG. 2B shows a magnified view of a radially inner end of one of the seals from FIG. 2A.

In a second embodiment of the rolling bearing assembly 1' shown in FIG. 2A, two non-contacting seals 2*a*, 2*b* are provided. In the second embodiment, the at least one first circumferentially extending groove 8' of the radially outer ring 4' comprises two first circumferentially extending grooves 8*a*, 8*b* which are located at each axial end of the outer ring, and at least one second circumferentially extending groove 14' on the radially inner ring 10'. As shown in FIG. 2A, a second circumferentially extending groove 14*a* is provided on the right axial end of the bearing ring 10', and a circumferentially extending notch 14*b* is provided on the left axial end of the bearing ring 10'. This alternative groove-notch arrangement is provided as one embodiment of the radially inner ring 10', and one of ordinary skill in the art would recognize from the present application that the configuration could be altered to include two grooves, two notches, or a reversed groove-notch arrangement than shown in FIG. 2A. The second embodiment of the rolling bearing assembly 1' includes a cage 5 for supporting the rolling elements 16. As shown in FIG. 2A, the pairs of circumferentially extending grooves 8*a*, 8*b*, and the circumferentially extending groove 14*a* and circumferentially extending notch 14*b* are provided on opposite axial sides of the rolling elements 16. Two elastomeric seals 18*a*, 18*b* are provided in the second embodiment. Each of the two elastomeric seals 18*a*, 18*b* includes a radially outer end 20*a*, 20*b* fixedly engaged within a respective one of the first circumferentially extending grooves 8*a*, 8*b* of the radially outer ring 4, and a radially inner end 22*a*, 22*b* that extends radially inwardly a respective one of the second circumferentially extending groove 14*a* or circumferentially extending notch 14*b*. The radially outer ends 20*a*, 20*b* of the elastomeric seals 18*a*, 18*b* are each secured within a respective one of the first circumferentially extending grooves 8*a*, 8*b* of the radially outer ring 4' by a snap wire or a snap ring 26*a*, 26*b*. Similar to the first embodiment of FIGS. 1A and 1B, clearance is provided between respective ones of the radially inner ends 22*a*, 22*b* of the elastomeric seals 18*a*, 18*b* and the second circumferentially extending groove 14*a* and second circumferentially extending notch 14*b* of the radially inner ring 10'. FIG. 2B shows a magnified view of the radially inner end 22*b* of the elastomeric seal 18*b*. As shown in FIG. 2B, clearance is provided via both an axial clearance $C_{A3}$ and a radial clearance $C_{R2}$ between the radially inner end 22*b* of the at least one elastomeric seal 18*b* and the at least one second circumferentially extending notch 14*b* of the radially inner ring 10*b*. The radially inner bearing ring 10' of the second embodiment of the rolling bearing assembly 1' includes a retention rim 10*a'* on one axial end, similar to the first embodiment of the rolling bearing assembly 1. As shown in FIGS. 2A and 2B, the opposite axial end of the radially inner bearing ring 10' does not include a retention rim. One of ordinary skill in the art would recognize from the present disclosure that multiple configurations of the seal and rings could be used, as long as an indirect path is provided and contact between the seal and the ring is avoided.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A rolling bearing assembly comprising:
   a radially outer ring defining an outer race, the radially outer ring includes at least two first circumferentially extending grooves;
   a radially inner ring defining an inner race, the radially inner ring includes at least one first circumferentially extending notch and at least one second circumferentially extending groove;
   rolling elements supported between the radially inner ring and the radially outer ring, the rolling elements running on the inner race and the outer race; and
   at least two elastomeric seals, wherein a first one of the at least two elastomeric seals is arranged on a first axial side of the rolling elements and a second one of the at least two elastomeric seals is arranged on a second axial side of the rolling elements, each of the at least two elastomeric seals extending between the radially inner ring and the radially outer ring;
   wherein the first one of the at least two elastomeric seals includes a first radially outer end engaged within a first one of the at least two first circumferentially extending grooves of the radially outer ring, and the second one of the at least two elastomeric seals includes a second radially outer end engaged within a second one of the at least two first circumferentially extending grooves of the radially outer ring;

the first one of the at least two elastomeric seals includes a first radially inner end extending radially inwardly towards the radially inner ring and arranged at least partially within the at least one second circumferentially extending groove of the radially inner ring, wherein clearance is provided between the first radially inner end of the first one of the at least two elastomeric seals and the at least one second circumferentially extending groove of the radially inner ring; and the second one of the at least two elastomeric seals includes a second radially inner end extending radially inwardly towards the radially inner ring and arranged at least partially within the at least one first circumferentially extending notch of the radially inner ring, wherein clearance is provided between the radially inner end of the second one of the at least two elastomeric seals and the at least one first circumferentially extending notch of the radially inner ring.

2. The rolling bearing assembly of claim 1, wherein the at least two elastomeric seals are comprised of a fiber laminate.

3. The rolling bearing assembly of claim 1, wherein a clearance is provided in both an axial direction and a radial direction between the radially inner end of the first one of the at least two elastomeric seals and the at least one second circumferentially extending groove of the radially inner ring.

4. The rolling bearing assembly of claim 1, wherein at least one second circumferentially extending groove in the radially inner ring forms a retention rim at a first axial end surface of the radially inner ring.

5. The rolling bearing assembly of claim 4, wherein an annular retention pocket is formed for the radially inner end of the first one of the at least two elastomeric seals via the retention rim and the at least one second circumferentially extending groove.

6. The rolling bearing assembly of claim 1, wherein the radially outer ends of the at least two elastomeric seals are each secured within a respective one of the two first circumferentially extending grooves of the radially outer ring by a snap wire or a snap ring.

* * * * *